United States Patent
Jernigan, Jr.

[15] 3,655,979
[45] Apr. 11, 1972

[54] RADIATION GAUGE FOR MONITORING SHEET PROPERTIES EMPLOYING A SCANNED SOURCE

[72] Inventor: Ernest D. Jernigan, Jr., Columbus, Ohio
[73] Assignee: Industrial Nucleonics Corporation
[22] Filed: May 10, 1968
[21] Appl. No.: 728,195

[52] U.S. Cl. ......................... 250/83.3 D, 250/52, 250/71.5 R
[51] Int. Cl. ........................................................ G01t 1/17
[58] Field of Search ............... 250/83.3 D, 83.6, 83 C, 71.5 S, 250/52

[56] References Cited

UNITED STATES PATENTS

| | | | |
|---|---|---|---|
| 2,965,758 | 12/1960 | Malick | 250/83.3 |
| 3,006,225 | 10/1961 | Mamas | 250/83.3 C UX |
| 3,016,460 | 1/1962 | Andressen | 250/83.6 |

Primary Examiner—James W. Lawrence
Assistant Examiner—Morton J. Frome
Attorney—Lowe and King, William T. Fryer, III, James J. O'Reilly and S. Henry Peterson

[57] ABSTRACT

A radiation gauge for monitoring a property of a sheet material includes, in combination with an array of stationary detectors positioned across the sheet width, a source of penetrating radiation scanned across the width of the sheet in response to fluid pressure. The source position is determined in response to signals read out from the several detectors comprising the array. The source pattern is effectively maintained isotropic by a slot and key arrangement or by rotating the source at a relatively high spin velocity. The individual detectors are calibrated for different responses across the sheet width. Source detector standardization is performed by translating the source to an off-sheet position so that the source field impinges on an off-sheet detector. In response to standardizing with the off-sheet detector, each of the other detectors is standardized in a like manner.

36 Claims, 5 Drawing Figures

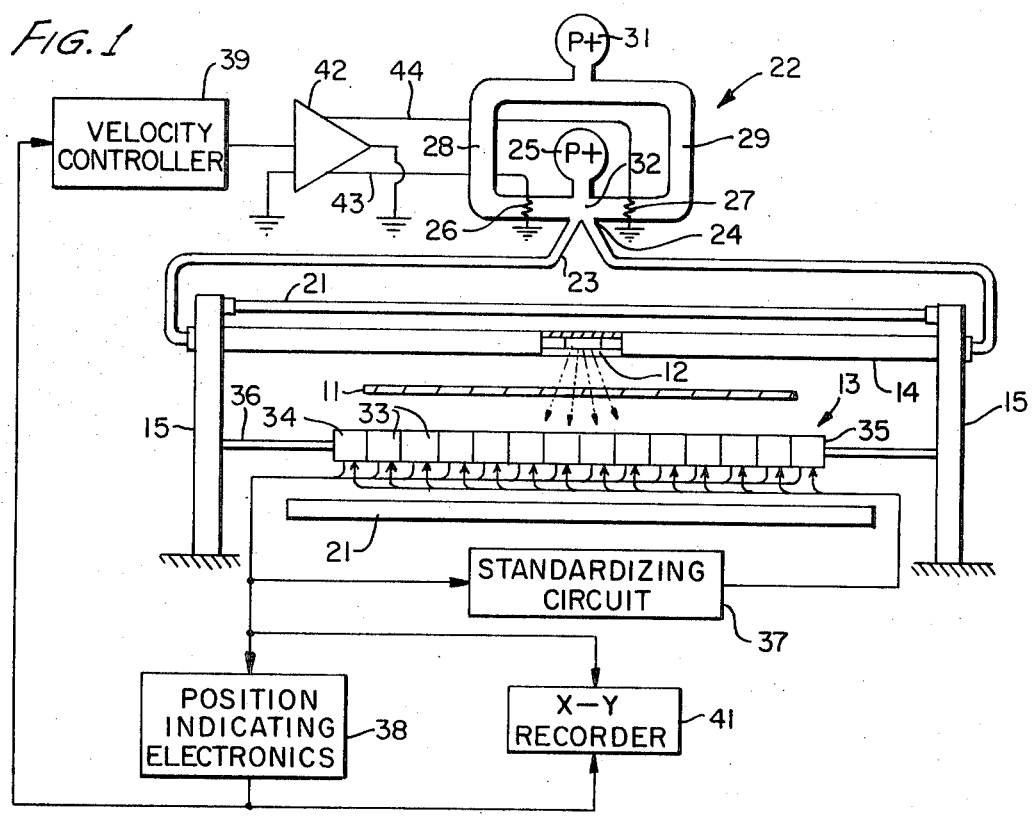
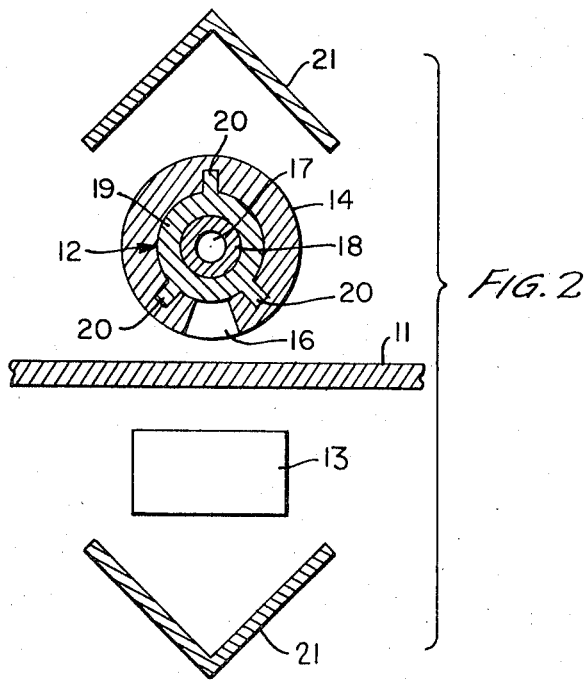
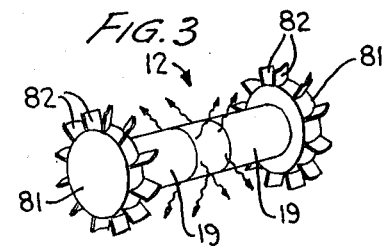

RADIATION GAUGE FOR MONITORING SHEET PROPERTIES EMPLOYING A SCANNED SOURCE

The present invention relates generally to radiation gauges utilized for measuring sheet properties in industrial processes, and more particularly to a radiation gauge of said class wherein a radiation source is scanned across the width of a sheet to irradiate a stationary detector means at each of the scanned positions.

Radiation gauges are commonly utilized for measuring sheet material properties, such as weight per unit area (basis weight), density or thickness, while a sheet is being manufactured. These gauges are of the type that emit X-rays, gamma rays, beta rays, infrared or other forms of penetrating radiation. The gauges generally comprise a source of radioactive material including a particle emissive substance or a source of penetrating waves. Some of the particles or waves pass through a material being measured to irradiate an ionization radiation detector. The number of particles impinging on the detector is determined by factors such as basis weight, density, or thickness of the material. The detector output current is a function of material thickness, if density is known, or density if thickness is known. Gauges of this type are frequently employed for measuring the basis weight of paper during manufacture, the thickness of plastic and metal sheets during manufacture, etc.

Typically, prior art penetrating radiation gauges utilized for monitoring a material property have included source and detector, defining approximately a 3-inch aperture. The source and detector are translated together across the entire width of the sheet to derive profile measurements indicative of the sheet property of interest. Mechanisms for traversing the source and detector across the sheet width have generally fallen into two classes, namely: a C-bracket structure wherein the source and detector are mounted by a pair of holding arms on opposite sides of the sheet and are traversed across the sheet by a single mechanical structure; and an X-beam configuration wherein the source and detector are traversed across the sheet by a synchronous motor, chain drive and gear arrangement. The C-bracket installation is generally utilized for scanning the source and detector across sheet widths up to 100 inches, while the X-beam configuration is generally employed for sheet widths between 100 and 500 inches.

While the prior art structures have functioned admirably to provide measurements of sheet material properties, they are beset by certain problems. In particular, both types of structures require relatively complex, high power and expensive drive mechanisms to move relatively large masses across the sheet material. In addition, there is a problem of the source and detector spacing varying as a function of the gauge being scanned across the sheet. In a penetrating radiation gauge, it is a general desideratum to maintain the source and detector spacing constant because different air volumes absorb the radiation by differing amounts to produce erroneous gauge readings. Collimators and other source-detecting geometry structures have successfully minimized much of these errors.

The separation between the source and detector in the C-frame structure occurs in response to temperature changes causing deflections of the holding arms relative to each other. In industrial environments, it is generally impossible to control temperature to any degree of exactness so that it is difficult to compensate for temperature changes tending to vary the source detector separation. With regard to the I-beam structure for translating the source and detector across the sheet width, misalignment of the source and detector results from missynchronization of the motors and wear to mechanical parts, such as gears and chain drives. Misalignment of the source and detector causes the same general type of problem as occurs due to changes of the source and detector separation.

Another adverse effect of temperature on existing radiation gauges is that temperature changes have a tendency to twist and rotate the mechanical structure carrying the source and detector. Twisting and rotation of the mechanical support structure can have particularly adverse effects since the source and detector are not symmetrical, but are generally of a rectilinear configuration, and can thereby result in further misalignment of the source and detector.

In analyzing many different types of sheet materials, it is frequently desired to consider property variations at certain cross machine positions with a greater accuracy than at other locations. With the existing type of system, however, the properties at all points across the sheet width are generally monitored with exactly the same precision because the scanning rate of the source and detector is constant across the entire sheet width. It is generally necessary to maintain the source and detector scanning velocity across the sheet width relatively constant because AC synchronous motors are utilized for transport purposes. The use of AC synchronous motors has the further disadvantage of preventing the rapid movement of the gauge apparatus to a cross sheet location which suddenly requires inspection because the processor may have malfunctioned at that cross-machine location.

While certain systems have been suggested for obviating the problem involved in scanning a source and detector across the sheet width, none of these systems has received any actual utilization to my knowledge. These systems have generally required either an elongated source or a plurality of sources and/or detectors positioned across the entire sheet width. It is immediately apparent that to monitor properties of sheets having widths of 100 inches or more, the use of plural sources and/or detectors is impractical from an economic standpoint.

In accordance with the present invention, many of the problems associated with scanning detectors and sources, as well as multiple sources and/or detectors, are obviated by employing a source that is movable across the sheet width, in combination with detector means positioned to receive radiation from the movable source. The source is lightweight and readily moved through a tube or the like so that the problems of source detector relative separation as a function of cross-direction position are substantially eliminated. If there is any change in separation between the source and detector means, it is readily calibrated by providing a detector means with a multiplicity of separate detector elements, each having a response which can be altered to compensate for relative deviations between the source and detector separation. Because the source and detector are not moved together across the sheet, the problem of relative cross sheet misalignment between the source and detector is nonexistent with the configuration of the present invention.

The source and detector housings of the present invention are considerably smaller in size and require less volume than prior art systems wherein the source and detector are scanned together across the sheet width. In particular, the source carrier, of tubelike configuration, is stationary and serves the dual function of a carrier and a radiation shielding means. If additional radiation shielding is required, it is in the form of stationary shield plates that are not translated with the source and detector.

A feature of the invention is that the radiation source is of circular cross section, enabling the tube in which the source is positioned to also have a circular configuration. The circular, symmetrical cross-sectional configuration of the source and carrier tube prevents substantial twisting and rotation as a function of temperature, whereby source detector alignment along the length of the sheet, in the machine direction, is maintained. The circular configuration of the source, relative to the rectilinear configuration of the prior art source, reduces the accumulation of foreign materials on the source so that the level of penetrating radiation reaching the sheet and detector remains relatively constant, as does the gauge sensitivity.

Because the source is lightweight, it is capable of being translated at high velocities to a particular cross machine location. In particular, the lightweight source does not require the use of high powered synchronous motors for accurate translation thereof, but low powered means such as pneumatic sources or DC motors may be utilized for transporting the source at variable velocities across the sheet width. By varying the rate of travel of the source to a particular cross sheet location, different regions of the sheet can be examined with greater accuracy than others, as is frequently desired. The use of fluid means, such as an air source, for translating the radiation source across the sheet width is of particular advantage because a fluid drive enables a constant and even thrust to be applied to the source when it is desired to maintain uniformity of scan velocity.

According to a further feature of the invention, the radiation pattern directed by the source to the detector means is maintained effectively isotropic by a pair of separate and distinct arrangements. In accordance with one of the arrangements, the source radiation pattern directed toward the detector means is maintained constant by providing a key and slot arrangement for the source container or shuttle and the carrying tube therefor. The key and slot arrangement prevents rotation of the cylindrical source in the tube carrier and maintains an even distribution of the radiation field pattern. In accordance with another embodiment of the invention, the source is rotated at a high rotational velocity in the tube relative to its translation across the sheet width. The rotation rate is such that low pass filter means included in the detector is incapable of passing the variations resulting from the source being rotated and derives an output signal unrelated to unbalance in the source pattern geometry.

An added feature of the multiple detector arrangement is that the position of the source across the sheet width is readily determined. In particular, the source position can be determined by comparing the responses of the several detectors and determining which of the detectors is deriving an output indicating that the source is proximate thereto. With a knowledge of the source position, control of the source translational velocity can be maintained readily, enabling different sections of the sheet to be examined with varying degrees of preciseness.

According to another aspect of the present invention, the detector means includes an element positioned beyond the edge of the sheet being examined. The detector at the sheet edge can be utilized for two purposes, namely: periodic standardization of the source and detector, which is necessary to compensate for factors such as changes in the radiation level of the source and accumulation of dirt; and to provide a positional indication of the detector for control purposes, a function generally performed in existing equipment by means of microswitches. When the detector unit positioned at the off-sheet location is utilized for standardization, the measurements resulting therefrom are utilized for controlling the response of the detectors located across the sheet width.

It is, accordingly, an object of the present invention to provide a new and improved penetrating radiation gauge.

Another object of the present invention is to provide a new and improved nuclear gauge wherein the distance separating a source and detector is maintained relatively constant, and the source and detector separation distance and alignment are maintained constant, despite temperature changes and factors due to wear of parts.

Another object of the present invention is to provide a new and improved nuclear radiation gauge that is relatively lightweight, inexpensive and employs a minimum number of moving parts, whereby the amount of power required to scan a sheet and the volume requirements of the gauge are minimized.

An additional object of the present invention is to provide a new and improved radiation gauge wherein the gauge response is not subject to wide variations because the amount of foreign material accumulated on a radiation source is minimized.

A further object of the invention is to provide a scanning radiation gauge wherein the position of the source can be varied at will over a range of velocities.

Yet another object of the present invention is to provide a new and improved system for enabling the position of a scanning radiation source to be determined.

Still a further object of the present invention is to provide a new and improved scanning radiation gauge capable of being calibrated at a multiplicity of cross sheet locations, whereby the gauge response is maintained constant despite possible changes in separation between the source and detector.

Still another object of the present invention is to provide a new and improved scanning radiation gauge for analyzing properties of sheet material, wherein the gauge is standardized by translating the source in proximity to a detector that is always at an off-sheet location, enabling other detectors to be standardized and an indication that the detector has traversed across the entire sheet width to be provided.

Still a further object of the present invention is to provide a new and improved radiation gauge wherein an isotropic pattern is effectively maintained between the source and detector.

Yet an additional object of the present invention is to provide a new and improved scanning radiation gauge wherein an isotropic pattern is effectively derived in the path between the source and detector, despite unbalance due to inherent nonisotropic properties of the radiation source.

Yet another object of the present invention is to provide a new and improved system for transporting a radiation gauge across the width of a sheet, wherein the gauge can be scanned over a desired range of velocities or at a constant velocity in a facile manner.

The above and still further objects, features and advantages of the present invention will become apparent upon consideration of the following detailed description of several specific embodiments thereof, especially when taken in conjunction with the accompanying drawings, wherein:

FIG. 1 is a schematic diagram illustrating one embodiment of the present invention;

FIG. 2 is a cross-sectional view illustrating an embodiment of the invention wherein a source is keyed;

FIG. 3 is a perspective view of another embodiment of a source in accordance with the invention;

FIG. 4 is a cross-sectional view illustrating the source of FIG. 3 in combination with a tube for carrying the source.

Figure 5:
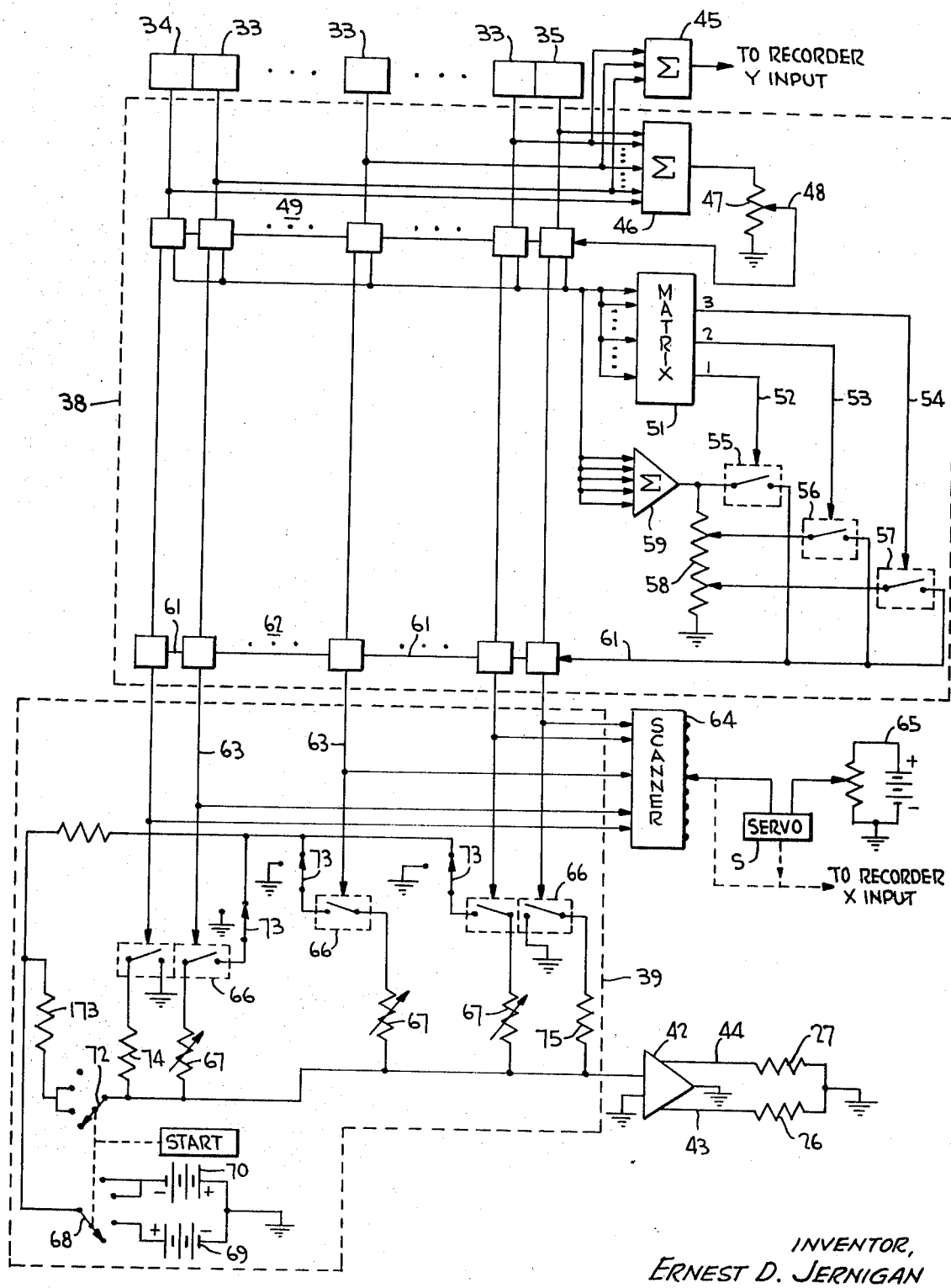
FIG. 5 is a block diagram of a circuit embodying the position indicating electronics and velocity controller of FIG. 1.

Reference is now made to FIG. 1 of the drawings wherein there is illustrated in schematic form a front view of a cross section of paper sheet 11, having on opposite sides thereof a shuttle comprising scanning penetrating radiation source 12 and stationary detector array 13, responsive to a radiation field propagated from the source through the sheet. The probe arrangement including source 12 and detector array 13 can be utilized for measuring one of a plurality of sheet properties, such as density, basis weight or thickness. The sheet 11 may be any one of a multiplicity of types which are commonly manufactured, such types being paper, steel, plastic, etc. Radiation source 12 may either be of the nucleonic type and comprise a source of beta or gamma rays, or a relatively small X-ray source, or of the penetrating infrared type.

Shuttle 12 is selectively scanned across the entire width of sheet 11, a distance typically between 24 and 500 inches, by being translated through a cylindrical bore in tube 14. Tube 14, having a circular cross section, is fixedly mounted on standards 15, positioned beyond the edges of sheet 11, and is fabricated of a radiation shielding material, such as lead. By fabricating tube 14 out of a dense material, the carrier for source 12 serves a dual purpose, namely: to prevent radiation from escaping from the source and substantially minimize a health hazard problem; and to carry the source between the edges of sheet 11. Because tube 14 is stationary and the source 12 is relatively lightweight, the source can be translated from one edge of sheet 11 to the other with a minimum power requirement.

Tube 14 includes an aperture or window 16, in the lower extremity thereof, to enable radiation from source 12 to be directed through sheet 11 to the detectors of array 13. Window 16, running the length of tube 14, is fabricated of a lightweight metal, such as aluminum, to enable radiation from source 12 to be easily propagated through the bottom of tube 14, through sheet 11 and to be detected by array 13. Window 16 completes the circular cross section of tube 14 and is bonded to the radially extending portion of tube 14 to provide a pressure seal for substantially preventing the escape of gas from the tube interior. The circular, cylindrical configuration of tube 14 and window 16 prevents the accumulation of foreign materials on the exterior of the window, a desired feature so that the sensitivity of the gauge can be maintained at a maximum and relatively constant level.

Shuttle 12 is of generally cylindrical form, having a length on the order of 4 inches, and a diameter of approximately 3 inches. At the center of shuttle 12 is located cylinder or pellet 17, FIG. 2, fabricated of a radioactive material, such as cobalt, and having a length of approximately 3 inches and a diameter of approximately 1 inch. At the opposite planar end surfaces of cobalt source 17, shuttle 12 includes approximately one-half inch of shielding material. Surrounding cobalt source 17 are a pair of annular cylinders 18 and 19, also fabricated of a heavy material, such as lead. A pair of concentric annular sleeves surround source 17 so that if one of the tubes 18 or 19 should fracture, there is no direct, unshielded radiation path from cobalt energy source 17 to an exterior environment. To maintain the radiation pattern derived from pellet 17 constant, regardless of possible inhomogeneousness of the cobalt radiation pattern, shuttle 12 includes keys 20 which ride in mated slots or keyways running the entire length along the interior of tube 14.

To further prevent the escape of the radiation field pattern from source 12 to regions beyond the area proximate sheet 11 and the gauge structure, stationary V-shaped hoods 21, fabricated of a heavy, nuclear shielding material, are positioned above source 12 and beneath detector array 13. Additional stationary shields (not shown) can be inserted to either side of sheet 11, in proximity to standards 15.

According to a preferred embodiment of the invention, shuttle 12 is translated across the entire width of sheet 11 by pneumatic means. The pneumatic means for translating source 12 comprises a pure fluid amplifier 22 having a pair of differential output conduits 23 and 24 respectively connected to the left and right ends of the bore running the length of tube 14. Outlet conduits 23 and 24 of amplifier 22 are responsive to variable relative mass volume flow rates from high pressure pneumatic source 25. The relative mass volume flow rates of fluid reaching conduits 23 and 24 depend upon the amount of heat generated by electric resistors 26 and 27 in control passages 28 and 29, respectively, of the amplifier.

Control passages 28 and 29 are fed with fluid from pneumatic pressure source 31 to control the deflection of air from source 25 in interaction region 32. The relative pressure in passages 28 and 29 as supplied to interaction region 32 determines the volume flow rate of fluid in outlet conduits 23 and 24. For example, if equal voltages are applied to heating resistors 26 and 27, equal pressures are applied by control conduits 28 and 29 to interaction region 32. In response to equal pressures being applied to interaction region 32 through conduits 28 and 29, the power delivered by high pressure source 25 to outlet conduits 23 and 24 is equal and shuttle 12 remains in situ. If, however, the voltage applied to resistor 26 exceeds the voltage applied to resistor 27, the gas in conduit 28 becomes hotter than the gas in conduit 29, with a resulting decrease in pressure of the gas in conduit 28 relative to the pressure of the gas in conduit 29. In response to the resulting pressure difference in the gases contained within conduits 28 and 29, the jet of fluid from source 25 is deflected in interaction region 32 so that a greater mass volume flow rate of air subsists in outlet conduit 23 than in outlet conduit 24 and shuttle 12 is translated from left to right, as viewed in FIG. 1. If a greater voltage is applied to resistor 27 than to resistor 26 the mass volume flow rate applied to conduit 24 exceeds the flow rate in conduit 23 and shuttle 12 is translated from right to left.

From the foregoing, shuttle 12 can be translated at will to any point across the width of sheet 11 and the shuttle velocity in being transported to different cross sheet or cross machine direction locations can be readily varied. By translating shuttle 12 at variable velocities across the width of sheet 11 in response to the voltages applied to heating resistors 26 and 27, a more complete analysis of certain portions of the sheet can be made than of other portions. In addition, it is a relatively facile operation to transport shuttle 12 at a rapid rate to any cross sheet portion of sheet 11 that suddenly may require a detailed analysis.

Consideration will now be given to the apparatus comprising stationary detector means or array 13. In particular, detector array 13 includes a multiplicity of individual detector elements 33 located beneath sheet 11, as well as detector elements 34 and 35 respectively located beyond the left and right edges of the sheet. Each of detector elements 33–35 is aligned at the same longitudinal position relative to sheet 11 but at a different cross sheet location, so that each of the detectors provides an output indicative of a property of sheet 11 only in approximately the same cross machine location as the detector occupies. Thereby, there is no requirement for any portion of detector array 13 to be scanned across the width of sheet 11 and many of the problems which occur in prior art source detector arrays are obviated. Instead, the entire array of detectors 33, 34 and 35 is maintained stationary by horizontal arms 36 which extend from standards 15.

Each of the detectors 33–35 in array 13 has a relatively narrow, approximately 1 inch, aperture in the direction of travel of sheet 11, and an aperture length across the sheet width of approximately 3 inches. The different detector elements in array 13 are aligned so that the apertures of neighboring arrays are separated from each other by a minimum distance so that a relatively even and continuous output signal is derived from the entire array, even through it includes a multiplicity of discrete detector elements. Virtually complete coverage of the entire width of sheet 11 is attained by minimizing the separation between apertures of adjacent detectors. It is noted that source 12 cannot span more than two of the detectors in array 13 simultaneously although the pattern from the source can be received, typically, by three or more detectors in array 13 because the beam can diverge and be scattered by sheet 11 and particles in the air.

Each of the detectors in array 13 is driven from a common power supply and is of the well-known type, including an ionization radiation detector feeding a high input resistance and smoothing capacitor which together comprise a low pass filter having an ascertainable cutoff frequency. A DC voltage is developed across the resistance and capacitor and fed to a DC amplifier, the output of which is connected in a circuit with a feedback bridge to the input resistance. To standardize the gauge and compensate for drift in the amplifier, a variable resistor is included in the power supply circuit thereof. Variations in the radiation level of the filed emerging from the source comprising shuttle 12 are compensated with a variable potentiometer that is provided in the feedback circuit. The detector configuration and standardization circuit are specifically described in detail in U.S. Pat. Nos. 2,790,945 and 2,829,268, issued to H. R. Chope.

Prior to the time that the system is put into operation, each of the separate detectors in array 13 is calibrated, i.e., the detectors are calibrated at a time when sheet 11 is not in the gap between the source 12 and detector array. During calibration, the sensitivity and midrange settings of each of detectors 33, 34 and 35 are adjusted so that each of the detectors derives the same output. Calibration of detectors 33, 34, and 35 is performed by stepping source 12 to a position above the window or aperture of each individual detector, in a manner described infra. Each of the detectors in array 13 must be separately calibrated because each inherently has a different response and there may be a slight difference in the distance separating the individual detectors from source 12. The individual calibration of each of the detectors in array 13 enables variations due to mechanical and electronic phenomena to be compensated.

After each of the detectors in array 13 has been calibrated, the drift or amplifiers in each of the detector circuits is eliminated by short circuiting the amplifier input terminals and adjusting the variable resistor in the amplifier power supply until a zero output voltage is derived from the amplifier. After the drift of each of the amplifiers in the detectors of array 13 has been eliminated, source 12 is standardized by being driven to a position above detector 34, beyond the left edge of sheet 11. The effective gain of the detector circuit 34 is adjusted by varying the feedback circuit potentiometer until a predetermined output level is derived from the detector in response to the radiation from source 12 impinging thereon. By deriving a predetermined voltage from detector 34 for a standard condition of no material of sheet 11 being between the source 12 and detector 34, compensation is provided for an inherent decay in the nucleonic energy of the source and for possible accumulation of foreign matter on the source aperture. In response to adjustment of the feedback potentiometer of detector 34, the feedback potentiometer of each of the other detectors in array 13 is adjusted by standardization circuit 37, disclosed in detail in Chope U.S. Pat. No. 2,829,268.

After the system has been put into use, source 12 is periodically standardized under the control of standardizing circuit 37, approximately once every half hour. During standardization, shuttle 12 is translated to an off-sheet position, whereby a standard condition of only air being in the radiation path between the source and detector exists.

The first operation in the standardizing process is to compensate for drift in the amplifier of detector 34. Standardizing circuit 37 measures the drift of the amplifier of detector 34, with the detector amplifier input terminals short circuited. To compensate for the drift of the amplifier of the detector 34, the amplifier output voltage is reduced to zero, as measured and controlled by standardizing circuit 37. In response to the reduction of the output signal of amplifier 34 to a zero level with the input terminal thereof short circuited, standardizing circuit 37 adjusts the output level of each of the remaining amplifiers in array 13 by a like manner. While no measurement is made of the drift in the amplifiers of detectors 33 and 35, it can generally be validly assumed that all of the amplifiers drift in a like direction and to a similar extent. The validity of this assumption is readily appreciated since each of the amplifiers is maintained in approximately the same environment and is driven by an identical high voltage source. While it is not believed necessary to adjust each of the amplifiers of detectors 33 and 35 individually, it is to be understood that if this were required, all of the amplifier input terminals of detectors 35–35 could be short circuited and the output voltages thereof individually adjusted to a zero level.

After the drift of amplifiers included in detectors 33-35 has been compensated during the standardization operation, fluctuations due to the intensity of radiation propagated from source 12 are compensated, with the shuttle positioned above detector 34. Standardizing circuit 37 responds to the output signal of detector 34 to adjust the feedback potentiometer thereof until the detector derives predetermined output level. A feedback potentiometer included in each of the other detectors in array 13 is also controlled by standardizing circuit 37 so that the gain of each detector is equalized. It is necessary to standardize source 12 only for one cross sheet location because the radiation derived from the source does not generally vary as a function of position across the sheet.

To derive an indication of the cross sheet location of shuttle 12, position indicating electronics network 38 is provided. Electronics network 38, described in detail infra, generally responds to the output level of each of detectors 33–35 to derive an indication of the cross sheet location of shuttle 12. In particular, as shuttle 12 crosses sheet 11, different ones of detectors 33-35 are successively irradiated and derive output voltages instantaneously commensurate with the amount of radiation impinging thereon. Since the detector in array 13 directly beneath shuttle 12 derives the greatest output voltage, the output signal level of each detector can be utilized as a measure of the source position.

The position indicating output signal of electronic network 38 is applied in parallel to velocity controller 39, which controls the operation of amplifier 22, and to the $x$ input of $x$-$y$ recorder 41. The $y$ input of $x$-$y$ recorder 41 is responsive to the combined property indicating outputs of all of detectors 33. In response to the $x$ input terminal voltage, a pen of recorder 41 is driven across the strip chart by an amount indicating the position of shuttle 12, while the $y$ input voltage deflects the pen orthogonally to the first named direction by an amount indicating the property value. Thereby, recorded 41 provides a permanent record of cross sheet properties of sheet 11 as a function of cross sheet position.

The position indicating signal derived from electronics network 38 is fed to velocity controller 39, adjusted to derive an output voltage so that at particular cross machine direction locations shuttle 12 can be translated at different speeds or be maintained in situ. Thereby, for all cross sheet positions of shuttle 12, the source longitudinal velocity can be controlled at will in a range from zero to a predetermined maximum value. In response to source 12 reaching a position beyond the edges of sheet 11, above either detector 34 or 35, the detector is stopped and maintained in situ. To initiate a new scan of detector 12 across the width of sheet 11, an operator activates a start switch and the output voltage of velocity controller 39 is reversed.

The output voltage of velocity controller 39 is applied as a single-ended, bipolarity signal to an input of DC amplifier 42, having a differential output relative to ground. Amplifier 42 derives equal output voltages on differential output leads 43 and 44 in response to a zero input voltage. For a positive input voltage, amplifier 42 derives a voltage on lead 43 that is greater than the voltage on lead 44, while the opposite relative voltages are derived on leads 43 and 44 in response to a negative input voltage being applied to amplifier 42. The magnitude of the voltage difference on leads 43 and 44 indicates the deviation of the amplifier input voltage relative to ground. As is seen infra, the voltages applied by leads 43 to 44 to heating resistors 26 and 27 are thereby proportional to the desired longitudinal velocity of source 12 across a particular section of sheet 11.

One possible embodiment for the apparatus included within position indicating electronic network 38 and velocity controller 39, is illustrated by the circuit diagram of FIG. 5, in combination with detectors 33 and 35 and the circuitry of amplifier 42. In FIG. 5, detectors 34 and 35 are illustrated, while only three of detectors 33 (between the edges of sheet 11) are shown to make the presentation more facile.

To derive an indication of the measured property of sheet 11, the output response of gauges 33 is fed to analog computer summing network 45, the analog output of which is fed to the $y$ input of recorder 41.

To monitor the position of source 12, circuit 38 generally functions to select the highest amplitude output of the different detectors. The general technique utilized for determining the largest detector output is to combine the output signals of all of the detectors and determine the average output of each detector. The average output is compared with the actual output of each detector and only those detector signals having an amplitude greater than the average are passed to a second circuit performing the same general function as the first circuit. The second circuit, however, includes means for determining the average value as a function of the number of signals from the detector array having an amplitude greater than the average value. The signal or signals derived from the second circuit of the type described are considered to be derived from the detector or detectors directly beneath source 12. By monitoring which of the detectors derives the largest amplitude output, an indication of the source location is derived.

To these ends, the output signals of detectors 33-35 are combined in analog computer summing amplifier network 46. Summing network 46 derives an output signal commensurate with the sum of all of the property indicating output signals of detectors 33-35. The DC output signal of amplifier 46 is divided in voltage divider 47 by a fixed factor, N, equal to the total number of detectors in array 13, i.e., the total number of detectors 33, 34 and 35.

The output voltage of divider 47, at tap 48, is applied in parallel to N comparison gates 49, one of which is included for each of the detectors in array 13. Each of comparison gates 49 is responsive to a second input signal, derived from the output of a different one of detectors 33-35. Each of gates 49 compares the inputs thereof and is opened to derive an analog output signal equal in magnitude to the output of its associated detector only if the input from the detector exceeds the input from tap 48. If the signal from tap 48 exceeds the magnitude of the signal from the detector to which the comparison gates is responsive, the comparison gate is closed.

Generally, finite, analog outputs are derived from at most three of comparison gates 49. If, for example, shuttle 12 is directly above one of detectors 13, a finite, maximum magnitude output signal is derived from the comparison gate 49 connected to that detector, and low amplitude signals are derived from the adjacent comparison gates. On the other hand, if shuttle 12 is between a pair of detectors 33, only those gates 49 associated with the pair of detectors generally derive finite signals and all other comparison gates are closed.

The states of comparison gates 49 are monitored as binary zero and one signals, respectively indicative of the comparison gate being in the closed and open circuited conditions. The binary signals indicative of the states of gates 49 are fed to matrix 51, which derives one of three output signals on leads 52, 53 and 54, respectively indicative of one, two or three of gates 49 being open to pass the outputs of detectors 33-35. the derivation of a binary one signal on leads 52-54 respectively closes normally open switches 55-57 whereby: switch 55 is closed if only one of gates 49 is open; switch 56 is closed only if a pair of gates are open; and switch 57 is closed only in response to three gates being opened.

Switches 55-57 are connected to different points on voltage divider 58, connected to the output terminal of DC amplifier 59. Amplifier 59 is of the summing type, having a plurality of inputs, each of which is responsive to a gated output voltage of one of comparison gates 49. Thereby, amplifier 59 derives an output voltage magnitude proportional to the sum of the output signals of detectors 33-35 passed through comparison gates 49. The output signal of amplifier 59 is divided in circuit 58 by one, two or three, depending upon which of switches 55-57 is closed, to derive an indication of the average value of the signal magnitudes passed through comparison gates 49.

The average value signal on lead 61 is fed in parallel to N comparison gates 62, each of which includes a second input terminal responsive to the output voltage of a corresponding one of comparison gates 49. Comparison gates 62 function in a manner similar to comparison gates 49, but derive only binary zero and one output signals in response to the inputs thereof; the gating function of gates 49 is thereby eliminated from gates 62. The binary zero and one levels are respectively derived in response to the particular comparison gate 62 being responsive to an output of comparison gate 49 less and greater than the amplitude of the signal on lead 61. Because of the increased selectivity of comparison gates 62, resulting from the averaging process involving voltage divider 58 and amplifier 59, only one or two of comparison gates 62 is responsive to a signal from comparison gates 49 that has a level greater than the amplitude of the signal on lead 61. By determining which of comparison gates 62 is responsive to a signal from comparison gates 49 in excess of the signal on lead 61, an indication is provided as to the position of source 12 across the width of sheet 11.

To activate the $x$ input cross sheet position indication of $x$-$y$ recorder 41, the signals from comparison gates 62 are fed into a scanner device 64. A reference voltage is provided by a voltage divider circuit 65. A servo S scans down the gate signals until a signal is detected that is nearly equal to the voltage provided by the reference circuit 65. Whereupon the servo S stops. The position of the rotor down the scanner is indicative of the cross sheet position of the source 12. The position of the servo may be transmitted to the $x$ input of $x$-$y$ recorder 41 as indicated by the dotted line. Means may be provided to decouple the pen motor of recorder 41 when servo S is in a "search" mode to eliminate confusing markings from the chart. Other means for indicating the cross sheet position of the source 12 on the recorder 41 will be apparent to those skilled in the art.

To signal the position of source 12 across the width of sheet 11 to velocity controller 39, the output of each of comparison gates 62 is applied to a control input terminal of N single pole double throw switches 66, included in the velocity controller. Each of switches 66 is of the relatively high inertia type, whereby the contacts of only one of the switches is closed at a time as shuttle 12 scans across the sheet width, despite the possibility of binary one signals being derived simultaneously from a pair of comparison gates 62 when a pair of detectors 33 are being equally irradiated. Under normal operating conditions, each of normally open switches 66, except the switches associated with detectors 34 and 35, selectively connects a voltage at contact 68 to the input terminal of amplifier 42. The current fed through each of switches 66, except the switches associated with detectors 34 and 35, is variably controlled by rheostats or variable resistors 67. The normally open switches 66 associated with detectors 34 and 35 selectively connect ground voltage through current limiting resistors 74 and 75 to the input terminal of amplifier 42 in response to shuttle 12 being translated to off-sheet positions at either side of sheet 11.

The polarity of the voltage applied to amplifier 42 is controlled by switch 68 which selectively connects either positive DC source 69 or negative DC source 70 to switches 66. Switch 68 is ganged with start switch 72 so that for each activation of the start switch, a different one of DC sources 69 or 70 is connected in circuit. Start switch 72 selectively connects the voltage at switch 68 to the input terminal of amplifier 42 by way of current limiting resistor 173, while the switches 66 responsive to detectors 33 selectively connect the voltage at contact 68 to the amplifier input by way of variable resistors 67.

In addition to the control provided automatically by comparison gate 62, source 12 can be located at will to any position across the width of sheet 11 by activation of the normally closed contacts of switches 73, one of which normally connects the contacts of each of switches 66 in series with switch 68. Each of normally closed switches 73 selectively connects a ground potential to the corresponding switch 66, under the control of an operator, if it is sought to stop shuttle 12 at a position corresponding with the location of the detector 33 with which switch 73 is associated.

The operation of the circuit of FIG. 5 can best be understood by considering, initially, that shuttle 12 is positioned above detector 34, at the left side of sheet 11. Under the stated circumstances, detector 34 is the only detector in array 13 deriving a significant output signal, whereby the comparison gates 49 and 62 connected in circuit with detector 34 are activated to the binary one state, while each of the other comparison gates 49 and 62 is activated to the binary zero state. The $x$-axis pen motor of recorder 41 positions the chart marker (not shown) at the extreme left hand side of a recording chart in accordance with the position of servo S. Simultaneously, switch 66 in circuit with detector 34 is closed to apply a ground voltage to the input terminal of amplifier 42.

In response to switch 66 associated with detector 34 being closed, and a zero voltage being applied to the input terminals of amplifier 42, the voltages applied to heating resistors 26 and 27 are equalized. Thereby, the fluid mass flow rates in outlet conduits 23 and 24 are the same and shuttle 12 remains in situ, above detector 34.

If it should now be desired to initiate a traverse of gauge 12 across the width of sheet 11, the operator activates start switch 72 for a predetermined time interval. Simultaneously with the depression of start switch 72, the position of contact 68 is changed so that it engages the negative terminal of DC source 70, for example, whereby the polarity of the voltage applied to the switching and resistor network including switches 66 and rheostat 67 is reversed. With start switch 72 still depressed, the negative voltage of source 70 is coupled through resistor 173 to the input terminal of amplifier 42, whereby a greater voltage is applied to heating resistor 27 than to heating resistor 26, and the former resistor generates more heat than the latter. In response to resistor 27 being heated to an extent greater than resistor 26, the mass flow rate in conduit 23 exceeds the flow rate in conduit 24 so source 12 commences translation in the right direction, away from detector 34. By the time source 12 reaches a position above the first of detectors 33, the operator has released button 72 and current passed through resistors 173 and switch 72 to the input terminal of amplifier 42 no longer subsists.

By that time, however, the comparison gates 49 and 62 associated with the first of the detector circuits 33 have been activated to an open state and the comparison gates associated with detector circuit 34 are closed. The binary one signal thereby derived from comparison gate 62 is applied to the control input of switch 66 for the first detector 33, to close the switch and enable a predetermined negative current to flow from source 70 through resistor 67 to the input terminal of amplifier 42. The magnitude of the current now being applied to the input terminal of amplifier 42 is commensurate with the desired velocity of source 12 as it is being translated in the region of the first of detectors 33. The negative current fed to the input terminal of amplifier 42 is reflected in the relative magnitudes of the voltages applied to resistors 26 and 27. If, for example, it is desired to translate source 12 past the first of detectors 33 with a high longitudinal velocity, the first of resistors 67 is adjusted to have a relatively small value and the amount of heat derived by resistor 26 exceeds that of resistor 27 by a significant amount.

In a similar manner, as each of detectors 33 is irradiated, the servo S moves down the scanner 64 in synchronization and actuates the pen motor of recorder 41 accordingly. Each of the resistors 67 associated with the remaining detectors 33 is adjusted to a value corresponding with the desired velocity of source 12 in the region defined by the detector 33 with which the resistor corresponds.

If, for example, it is desired to translate shuttle 12 across the width of the sheet until the shuttle comes to a position directly above the last (right) one of detectors 33, switch 73 connected in circuit with the last detector 33 is manually activated by an operator from the illustrated, closed circuit position to a ground connection. The translation of shuttle 12 to the last one of detectors 33 may be, e.g., to monitor the properties of sheet 11 for an emergency situation. Under such a circumstance shuttle 12 should be translated at a maximum velocity, a result achieved by adjusting each of rheostats 67, except the rheostat in circuit with the right detector 33, to a minimum value. With switch 73 associated with right detector 33 grounded, shuttle 12 comes to an abrupt stop above the last detector 33. The abrupt stop above the last detector 33 occurs because as that detector derives a maximum amplitude output signal, a ground potential is fed through contact 73 and the contacts of switch 66 to the input terminal of amplifier 42 which activates fluid amplifier 22 so that equal mass fluid flow rates occur in conduits 23 and 24.

If it is now desired to reinitiate longitudinal movement of source 12 across the width of sheet 11, from the last one of detectors 33 to detector 35, the operator manually activates contacts 73 so that a circuit from contact 68 to switch 66 exists. Thereby, current flows from contact 68 through switch 66 and the rheostat 67 in circuit with the last detector 33, producing an imbalance in the voltages applied to resistors 26 and 27 and a corresponding difference in the pressure applied to the opposite sides of source 12. When source 12 reaches detector 35, the comparison gates 49 and 62 in circuit with detector 35 are activated and a ground input potential is applied to amplifier 42 through the switch 66 connected in series with resistor 75.

To reinitiate another traverse of gauge 12 across sheet 11, the operator again presses start button 72, whereby contact 68 engages the positive terminal of DC source 69 and the pressure on the right side of source 12 exceeds the pressure on the left side, enabling the source to traverse the sheet from right to left.

In certain instances, source 17 has an uneven nuclear radiation pattern as a function of angular orientation. One means for effectively compensating for the uneven distribution is the key and slot arrangement described supra in conjunction with FIG. 2. If, however, the distribution is so uneven that an isotropic pattern cannot be derived with the configuration of FIG. 2, a relatively constant response of each of detectors 33 can be derived by spinning shuttle 12 at a high velocity, whereby the source pattern variations are reflected as a DC output voltage derived from the detectors of array 13.

The source pattern can be converted to a DC output voltage of the detector circuit if shuttle 12 is rotated a sufficient number of times while it is in the field of view or window of each of the detectors 33. In particular, if each detector has a low pass cutoff frequency of, for example, ten cycles per second, and source 12 is rotated with a rotational velocity of 15 cycles per second while in the detector field of view, the detector response is a DC signal independent of the uneven radiation pattern of the source.

One arrangement whereby shuttle 12 can be rotated at a sufficiently high velocity is specifically illustrated by the perspective and side views of FIGS. 3 and 4. In particular, the shuttle of FIGS. 3 and 4 includes an interior cobalt pellet 17 and a pair of annular, coaxial shields 18 and 19, as in the source illustrated specifically by FIG. 2. At the end of the tube defined by annular shield 19 are mounted a pair of circular, disc shoulders 81, which also function as radiation shield means. Mounted about the periphery of shoulders 81 is a plurality of blades 82, each having a pitch relative to the longitudinal axis of shuttle 12 and tube 14. In response to the laminar flow of air through the bore of tube 14, blades 82 rotate source 12 at the required velocity.

Wear between the tips of blades 82 and the interior wall defining the bore of tube 14 is minimized because the blades are dimensioned so that an air cushion subsists between them and the inside wall of the tube. The air cushion is so slight, however, that it does not materially effect the separation distance between pellet 17 and detectors in array 13.

While there have been described and illustrated several specific embodiments of the invention, it will be clear that variations in the details of the embodiments specifically illustrated and described may be made without departing from the true spirit and scope of the invention as defined in the appended claims. For example, other low power means, such as a DC motor and cable combination or a motor driven lead screw, can be utilized for translating shuttle 12 within tube 14. In such embodiments, the shuttle position can be ascertained by positioning a potentiometer slider with the motor shaft. Also, the array 13 of detectors can be replaced with a single detector extending across the entire width of sheet 11.

Moreover, a single small detector may be used instead of the plurality shown of the elongated type. The detector may be fixedly positioned at a desired cross sheet location or it may be positioned at will across the sheet by the same means used to position the source 12.

In a scanning measurement, the source and detector may be moved in synchronization by the same or separate fluid driving means. Electrical connection to the movable detector can be provided by strip conductors laid along the length of an elongated detector tube. Phosphor bronze wiping contacts can be provided on the detector to engage the strip conductors.

I claim:

1. A radiation gauge for monitoring a property of a sheet comprising a source of penetrating radiation positioned on one side of the sheet, stationary detector means responsive to a radiation field from said source, said detector means being disposed across at least most of the entire width of the sheet, and means for translating said source across at least most of the entire width of the sheet, said translating means comprising a stationary tube for carrying said source interiorly thereof, said source being included in a shuttle which travels in a bore of said tube.

2. The gauge of claim 1 wherein a portion of said detector means extends beyond the width of the sheet, and said means for translating includes means for translating the source beyond the width of the sheet to a region proximate said portion so that the sheet has virtually no effect on the radiation field coupled to said portion from said source.

3. The gauge of claim 2 further including means responsive to the radiation level impinging on said portion while said source is in said region for deriving signals enabling the source and detector means to be standardized.

4. The gauge of claim 1 wherein said detector means comprises a multiplicity of separate detector elements, each having a different field of view and including a separate network for deriving a signal indicative of a property of the sheet as determined by the amount of radiation each separate detector element receives from the source.

5. The gauge of claim 4 further including means for adjusting a characteristic of each of said networks.

6. The gauge of claim 5 wherein said adjusting means further includes means for adjusting a corresponding characteristic of each of said networks in a similar manner.

7. The gauge of claim 4 further including means responsive to the radiation received by each of said detector elements for deriving an indication of the source position across the width of the sheet.

8. The gauge of claim 7 further including means responsive to the position indication derived by said deriving means for controlling the velocity the source is scanned at different positions across the width of the sheet.

9. The gauge of claim 8 wherein said velocity controlling means includes means for selectively stopping said source in response to any one of said detector elements providing an indication of the source being positioned in the field of view thereof.

10. The gauge of claim 1 further including means for varying the velocity with which said source is translated across the sheet width.

11. The gauge of claim 10 wherein said velocity varying means includes means for changing the velocity the source is translated at different positions across the sheet width.

12. The gauge of claim 11 wherein said velocity changing means includes means responsive to the position of the source across the sheet.

13. The gauge of claim 12 wherein said velocity changing means includes means for at will stopping said source across the entire sheet width.

14. The gauge of claim 1 further including means sensing a field pattern derived across the width of the sheet in response to translation of the source for indicating the position of the source.

15. The gauge of claim 14 wherein the field pattern sensing means includes means responsive to the penetrating radiation source.

16. The gauge of claim 14 further including means responsive to the position indication derived by said sensing means for controlling the velocity the source is scanned at different positions across the width of the sheet.

17. The gauge of claim 1 wherein said tube is a shield of high density material to substantially prevent the passage of penetrating radiation and includes a window of low density material positioned and constructed to enable substantial radiation from the source to irradiate the sheet and detector.

18. The gauge of claim 17 further including high density stationary shield means positioned in proximity to the tube and detector means, said shield means substantially preventing the escape of penetrating radiation from the gauge vicinity without affecting the radiation pattern from the source propagated through the sheet to the detector means.

19. The gauge of claim 1 wherein said means for translating comprises fluid means for supplying pressure to the bore of said tube to translate said shuttle along the tube length.

20. The gauge of claim 19 further including means sensing a field pattern derived across the width of the sheet in response to translation of the source for indicating the position of the source, and said translating means includes means responsive to the position indication derived by said sensing means for supplying differential pressures to opposite ends of said tube to control the velocity the shuttle is scanned at different positions across the width of the sheet.

21. The gauge of claim 19 further including means for effectively maintaining a constant radiation pattern from the source to the sheet.

22. The gauge of claim 21 wherein said means for maintaining includes cooperating guide means on the bore and shuttle for maintaining the shuttle at a constant angular orientation relative to the detector means.

23. The gauge of claim 21 wherein said detector means includes low pass filter means having a predetermined cutoff frequency and said means for maintaining includes vane means on the shuttle for rotating the shuttle at least one turn while it is in the detector field of view, said shuttle being rotated in response to fluid flow from said fluid means with a rotational velocity such that the reciprocal of each period of revolution is greater than the cutoff frequency.

24. The gauge of claim 1 further including means for effectively maintaining a constant radiation pattern from the source to the sheet.

25. The gauge of claim 24 wherein said means for maintaining includes cooperating guide means on the bore and shuttle for maintaining the shuttle at a constant angular orientation relative to the detector.

26. The gauge of claim 24 wherein the bore interior and shuttle exterior are of circular cross section.

27. The gauge of claim 26 wherein said detector means includes low pass filter means having a predetermined cutoff frequency, and said means for maintaining includes means for rotating the shuttle at least one turn while it is in the detector field of view, said shuttle being rotated with a rotational velocity such that the reciprocal of each period of revolution is greater than the cutoff frequency.

28. The gauge of claim 1 wherein said tube and window have a circular outer cross section to prevent the substantial accumulation of foreign material on an outer surface of the window.

29. The gauge of claim 1 further including means for effectively maintaining a constant radiation pattern from the source to the sheet.

30. The gauge of claim 29 wherein said detector means includes low pass filter means having a predetermined cutoff frequency, and said means for maintaining includes means for rotating the source at least one turn while it is in the detector field of view, said source being rotated with a rotational velocity such that the reciprocal of each period of revolution is greater than the cutoff frequency.

31. The gauge of claim 1 further including means for rotating said source as it is translated across the width of the sheet.

32. A radiation gauge for monitoring a property of a sheet comprising a source of penetrating radiation positioned on one side of the sheet, means for translating said source across at least most of the sheet, said translating means comprising a stationary tube for carrying said source interiorly thereof, said source being included in a shuttle which travels in a bore of said tube, detector means extending across at least most of the sheet so as to be responsive to radiation from said source throughout the region of the sheet across which the source is translated, and means for rotating said source as it is being translated, said source being rotated about an axis coincident with a line along which the source is translated.

33. The gauge of claim 32 wherein said detector means includes low pass filter circuitry having a predetermined cutoff frequency, and means for rotating said source at least one turn while it is in the detector field of view, said source being rotated with an angular velocity such that the reciprocal of each period of revolution is in excess of said cutoff frequency.

34. A radiation gauge for monitoring a property of a sheet comprising a source of penetrating radiation, elongated stationary radiation shielding means positioned on one side of said sheet, said shielding means having a radiation aperture positioned adjacent to said sheet, said shielding and said aperture extending across at least most of the sheet, detector means positioned on the other side of said sheet, and means for moving said source within said elongated shielding means to irradiate said detector means through different portions of said aperture and said sheet.

35. A radiation gauge for monitoring a property of a sheet comprising a source of penetrating radiation positioned on one side of the sheet, elongated stationary radiation shielding means having a radiation aperture positioned adjacent to said sheet, said shielding and said aperture extending across at least most of the sheet, detector means responsive to a radiation field from said source and positioned on the opposite side of said sheet from said source, and means for translating said source within said elongated radiation shielding means to irradiate said detector through different portions of said aperture and said sheet.

36. A radiation gauge for monitoring a property of a width of material comprising a source of penetrating radiation, elongated stationary radiation shielding means positioned on one side of said material having a radiation aperture positioned adjacent to said material, said shielding and said aperture extending across at least most of said width of said material, means responsive to a radiation field from said source, and means for moving said source within said elongated shielding means to irradiate different portions of said material through different portions of said aperture.

* * * * *